(12) United States Patent
Michalopoulos

(10) Patent No.: US 11,337,403 B1
(45) Date of Patent: May 24, 2022

(54) SPILL-RESISTANT PET TRAINING PAD

(71) Applicant: George Michalopoulos, Los Angeles, CA (US)

(72) Inventor: George Michalopoulos, Los Angeles, CA (US)

(*) Notice: Subject to any disclaimer, the term of this patent is extended or adjusted under 35 U.S.C. 154(b) by 791 days.

(21) Appl. No.: 16/150,227

(22) Filed: Oct. 2, 2018

Related U.S. Application Data

(60) Provisional application No. 62/566,812, filed on Oct. 2, 2017.

(51) Int. Cl.
| | | |
|---|---|---|
| A01K 1/015 | (2006.01) | |
| B32B 7/12 | (2006.01) | |
| B32B 5/02 | (2006.01) | |
| B32B 27/12 | (2006.01) | |
| B32B 27/36 | (2006.01) | |
| B32B 38/00 | (2006.01) | |

(52) U.S. Cl.
CPC ............ *A01K 1/0157* (2013.01); *B32B 5/022* (2013.01); *B32B 7/12* (2013.01); *B32B 27/12* (2013.01); *B32B 27/36* (2013.01); *B32B 38/0004* (2013.01); *B32B 2262/0276* (2013.01); *B32B 2307/726* (2013.01); *B32B 2471/04* (2013.01)

(58) Field of Classification Search
CPC ..................................................... A01K 1/0157
See application file for complete search history.

(56) References Cited

U.S. PATENT DOCUMENTS

| | | | | |
|---|---|---|---|---|
| 5,797,347 A | * | 8/1998 | Ochi .................... | A01K 1/0107 119/169 |
| 2001/0042518 A1 | * | 11/2001 | Ikegami ............... | A01K 1/0107 119/161 |
| 2005/0166855 A1 | * | 8/2005 | Kaneko ................ | A01K 1/0157 119/169 |
| 2011/0146581 A1 | * | 6/2011 | Sasano ................. | A01K 1/0107 119/171 |
| 2013/0068169 A1 | * | 3/2013 | Miller .................. | A01K 1/0107 119/161 |
| 2014/0261208 A1 | * | 9/2014 | Calimano ............ | A01K 1/0157 119/161 |
| 2014/0338607 A1 | * | 11/2014 | Takagi ................. | A01K 1/0107 119/161 |

(Continued)

FOREIGN PATENT DOCUMENTS

CA 2845463 A1 * 9/2014 .......... A01K 1/0107

*Primary Examiner* — Monica L Barlow
(74) *Attorney, Agent, or Firm* — Fresh IP PLC; Clifford D. Hyra; Aubrey Y Chen

(57) ABSTRACT

A pet training pad includes a central absorbent pad on top of a waterproof bottom layer. The waterproof bottom layer covers one side of the central absorbent pad. The pet training pad also includes a wicking material around a periphery of the central absorbent pad and/or one or more fringe barriers around a periphery of the central absorbent pad. A pet training pad manufacturing method involves cutting a bottom waterproof plastic layer, placing die-cut absorbent layers on the bottom plastic layer and laminating or adhering the absorbent layers to the bottom waterproof plastic layer to keep the absorbent layers together and positioned, layering roll cut first fringe borders and wicking edges on the bottom waterproof plastic layer around borders of the absorbent layers and securing them in place, and cutting to create a final shape.

19 Claims, 14 Drawing Sheets

(56) References Cited

U.S. PATENT DOCUMENTS

| | | | |
|---|---|---|---|
| 2015/0164041 A1* | 6/2015 | Takahashi | E01H 1/1206 |
| | | | 119/161 |
| 2018/0317445 A1* | 11/2018 | Hasegawa | B32B 27/12 |
| 2020/0187451 A1* | 6/2020 | Onishi | A01K 1/0157 |

* cited by examiner

Minimal Spilled and Trapped Volume

SPILL-RESISTANT PET TRAINING PAD

This Applications claims the benefit of U.S. Provisional Application No. 62/566,812, filed Oct. 2, 2017, which is hereby incorporated by reference in its entirety.

BACKGROUND

The present disclosure relates to pet training pads.

Dogs typically are trained to relieve themselves outdoors. However, dogs who are not yet trained, or who are home alone, sick or elderly, or in a crate or carrier or other confined space such as a car, may be unable to wait until they are outdoors to relieve themselves. Pet training pads may be used in these situations, to receive a stream of urine from a dog and to contain it, and not allow it to ruin nearby fabrics, wood, or other materials.

To function properly, such pads need to minimize splash and leakage at their edges. Splash and spillage is common for pads when an animal urinates close to the edge or misses the pad completely.

Needs exist for improved pet training pads.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new pet training pad has a central absorbent pad on top of a waterproof bottom layer, wherein the waterproof bottom layer covers one side of the central absorbent pad and extends beyond the central absorbent pad around a periphery of the central absorbent pad and at least one of a) a wicking material on top of the waterproof bottom layer where the waterproof bottom layer extends beyond the central absorbent pad and b) one or more fringe barriers on top of the waterproof bottom layer where the waterproof bottom layer extends beyond the central absorbent pad, wherein the fringe barriers extend above a top surface of the central absorbent pad.

In some embodiments, the pet training pad has both a wicking material on top of the waterproof bottom layer where the waterproof bottom layer extends beyond the central absorbent pad and one or more fringe barriers on top of the waterproof bottom layer where the waterproof bottom layer extends beyond the central absorbent pad, and the fringe barriers extend above a top surface of the central absorbent pad. The one or more fringe barriers may be on top of the wicking material. The one or more fringe barriers may also be on top of the central absorbent pad. The one or more fringe barriers may comprise two fringe barriers stacked on top of each other. The fringe barriers may be attached to each other and to the wicking material by adhesive tape, and the wicking material may be attached to the waterproof bottom layer by adhesive tape.

In some embodiments, the pet training pad may include the wicking material, and the wicking material extends beyond an outer edge of the waterproof bottom layer. The wicking material may be felt.

In some embodiments, the pet training pad includes the one or more fringe barriers. The fringe barriers may be made of polyester. The fringe barriers may extend for example at an angle between 0° and 60°, in some embodiments between 5° and 60°, from a direction perpendicular to a plane of the top surface of the central absorbent pad.

A new pet training pad manufacturing method involves cutting a bottom waterproof plastic layer, placing die-cut absorbent layers on the bottom plastic layer and laminating or adhering the absorbent layers to the bottom waterproof plastic layer to keep the absorbent layers together and positioned, placing roll cut first fringe borders on two opposite sides of the waterproof plastic layer using hot melt adhesion, cutting wicking edges to a desired width and aligning them over the roll cut fringe borders and adhering the wicking edges with hot melt adhesion, die cutting second fringe borders to a desired width and aligning over wicking edges and adhering with heat weld adhesion, die cutting third fringe borders to a desired with and aligning over first fringe borders and adhering with heat weld adhesion, die cutting fourth fringe borders to a desired width and aligning over third fringe borders and adhering with heat weld adhesion, and cutting along the fourth fringe borders to create final shape.

These and other objectives and features of the invention are apparent in the disclosure, which includes the above and ongoing written specification.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
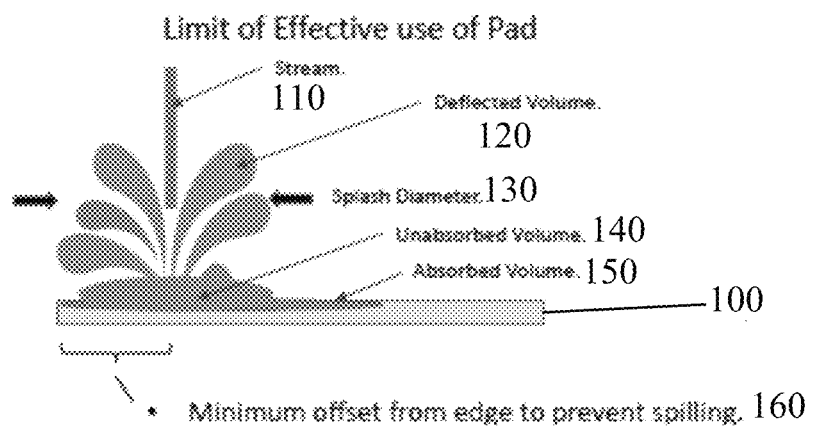
FIG. 1 is a cross-sectional diagram illustrating the limit of effective use of a prior art pet training pad.

A spill-resistant pet training pad will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise. Similarly, the words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Where securing, adhesion, or fixation is described herein, for example with reference to different layers of a pet training pad, it is to be recognized that many alternative forms of fixation, adhesion, or securing may be utilized and substituted for one another. While different methods may be preferable for different applications and balancing different desirable factors, generally such methods may be interchanged in various embodiments. For example, one adhesive may be used in one embodiment, but in other embodiments hot melt glue may be utilized, and/or lamination, pressure adhesion, mechanical fasteners such as rivets or staples, etc.

FIG. 1 is a cross-sectional diagram illustrating the limit of effective use of a prior art pet training pad. As shown, a certain minimum offset 160 of a liquid stream 110 from the edge of the pad 100 is required to prevent spilling. The offset required is based on the splash diameter 130 from the stream contact point of deflected volume 120 and retention of unabsorbed volume 140 as it is absorbed 150 into the pad. This required offset reduces the effective waste-catching and storage area of the pad.

Figure 2:
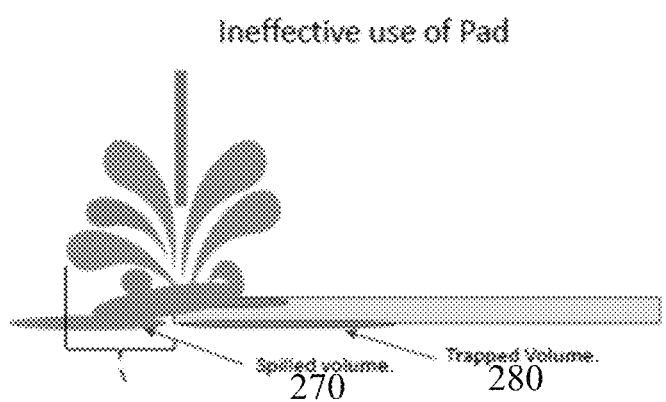
FIG. 2 is a cross-sectional diagram illustrating ineffective use of a prior art pet training pad.

FIG. 2 is a cross-sectional diagram illustrating ineffective use of a pet training pad. Here, the liquid stream hits the pad without the required offset from the pad's edge. The stream still hits the pad, but spilling 270 occurs and some liquid is trapped 280 under the pad. Spilling is due to deflected volume 120 and lost unabsorbed volume 140.

Figure 3:
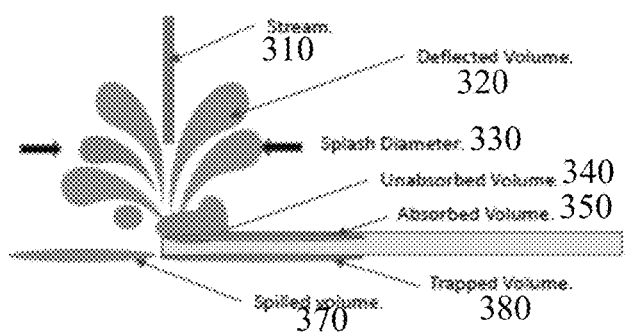
FIG. 3 is a cross-sectional diagram illustrating reduced spillage for a pet training pad, according to an embodiment of the present invention.

FIG. 3 is a cross-sectional diagram illustrating reduced spillage for a pet training pad, according to an embodiment of the present invention. Spillage 370 can be reduced by reducing the size of the splash diameter 330 of deflected volume 320, using mechanical features at the impact area, by deflecting the stream 310 using mechanical features to deflect the stream away from the edge of the pad, and by reducing the loss of unabsorbed volume 340, using mechanical features to capture and/or reroute unabsorbed volume 340 before it can spill, increasing absorption rate, and reabsorbing spilled volume and preventing a trapped volume 380. These features can maximize the effective area of the pad for the stream to hit while minimizing spill.

Figure 4:
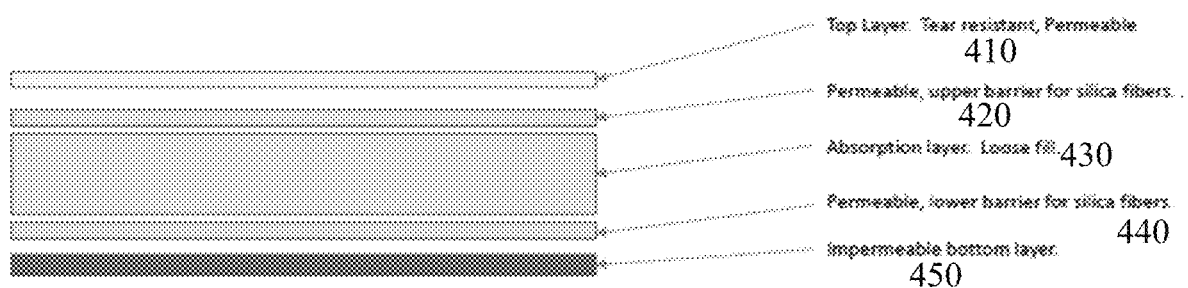
FIG. 4 is an exploded cross-sectional diagram illustrating pet training pad layers, according to an embodiment of the present invention.

FIG. 4 is an exploded cross-sectional diagram illustrating pet training pad layers, according to an embodiment of the present invention. The top layers 410 and permeable barriers 420, 440 as shown are polyester nonwoven fabric, which may be spunbond or meltblown. The absorption layer 430 is made up of silica fibers and may incorporate anti-odor chemicals. LDPE or a similar material is used for the flexible waterproof bottom layer 450. In other embodiments, materials may differ from those described for the illustrated embodiment. It is to be understood that where an absorbent layer is shown and described elsewhere, in fact the absorbent layer may itself comprise multiple layers as in the embodiment illustrated in FIG. 4.

For manufacturing, a conversion process may be utilized, combining raw materials off of rolls. For sizing and shaping, methods may include stamping to put a pattern into a material if not already present in the base material, slitting to set an initial width of materials, die cutting, web alignment to position materials for adhesion, crimping, cutting and inducing a shape into the material. For adhesion, lamination may be used to melt base materials together using heat or ultrasonic welding, but materials need to be meltable and compatible. Alternatively, hot melt glue may be used—many glues can be specified, or transfer adhesive lamination may be used—again, many adhesives can be specified. For packaging, folding may be based on final packaging design, manufacturer tooling, and intended end use customer interaction.

Figure 5:
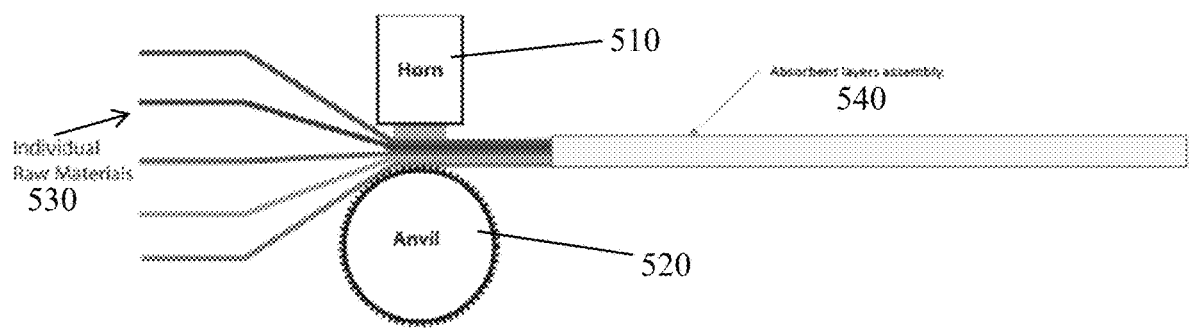
FIG. 5 is a diagram illustrating a pet training pad manufacturing method, according to an embodiment of the present invention.

FIG. 5 is a diagram illustrating a pet training pad manufacturing method, according to an embodiment of the present invention. Layers of individual raw materials 530 are squeezed between a horn 510 and an anvil 520 to join the materials into an absorbent layers assembly 540, forming the base of a pet training pad. Pressing material layers together with sufficient pressure will cause them to bind to one another.

Pads may be manufactured by combining known manufacturing techniques. In one example, a bottom plastic layer is slit to width and die cut absorbent layers are placed on the bottom plastic layer and laminated or adhered to keep absorbent layers together as well as to position them on the bottom plastic layer. Roll cut fringe border layers and wicking edge layers are placed on edges of the bottom plastic layer and/or on top of each other and secured. A final cut creates a single, separated pet training pad.

Figure 6:
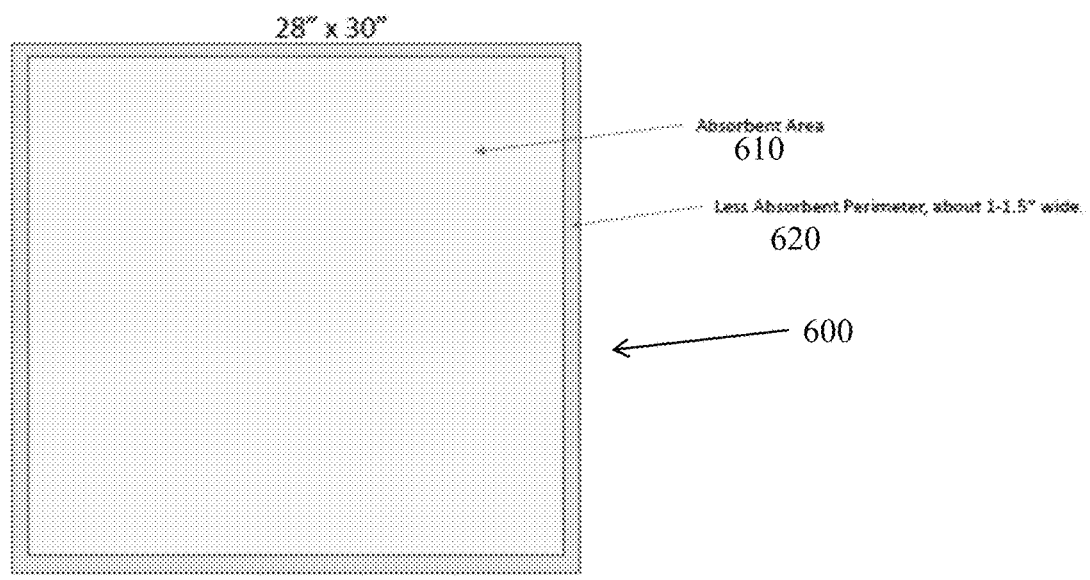
FIG. 6 is an overhead diagram illustrating pet training pad dimensions, according to an embodiment of the present invention.

FIG. 6 is an overhead diagram illustrating pet training pad dimensions, according to an embodiment of the present invention. Here, the pet training pad 600 shown is 28"×30" with an absorbent perimeter 620 of 1-1.5" and central absorbent area 610.

Figure 7:
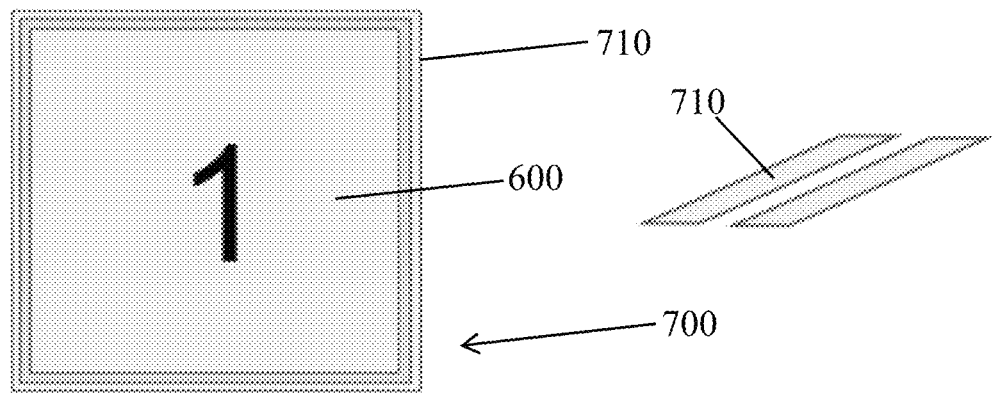
FIG. 7 is an overhead and detail diagram illustrating a pet training pad with fringe gutter, according to an embodiment of the present invention.

FIG. 7 is an overhead and detail diagram illustrating a pet training pad 700 with fringe gutter 710, according to an embodiment of the present invention. The fringe gutter 710 consists of adjacent strips of spunbond polyester fabric around the perimeter of the pad 700. This material is non-water permeable, lightweight, and stores flat. The fringe cut allows for a popped-up, taller barrier. It is also harder to rip by a dog's nails and won't catch or propagate tears. In other embodiments, the fringe may be or include other materials, for example it might include an absorbent material but be lined with an impermeable plastic or other material on the bottom and/or side farthest from the absorbent pad.

Figure 8:
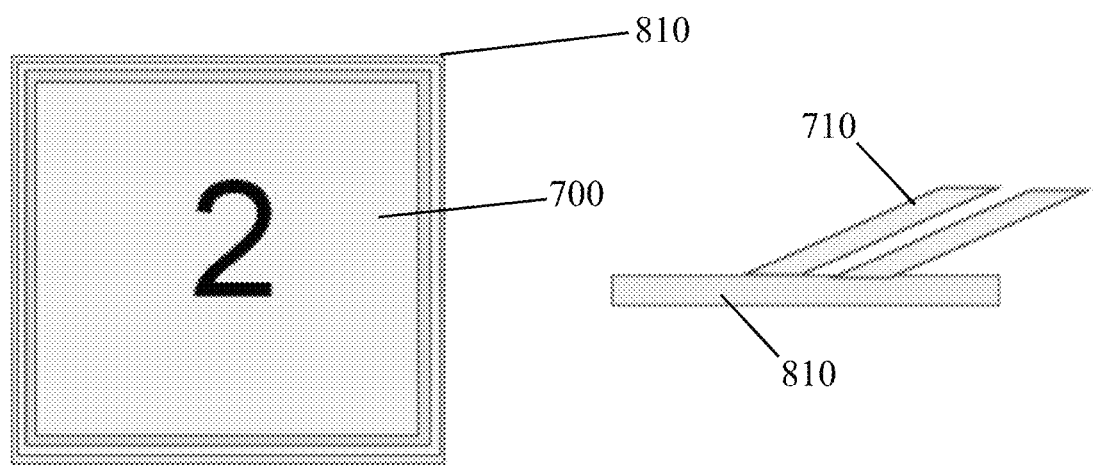
FIG. 8 is an overhead and detail diagram illustrating a pet training pad with fringe gutter and wicking perimeter, according to an embodiment of the present invention.

FIG. 8 is an overhead and detail diagram illustrating a pet training pad 700 with fringe gutter and wicking perimeter 810, according to an embodiment of the present invention. Wicking material 810 around the perimeter of the pad along with the fringe gutter soaks up spilled and trapped volume. Wicking material may in some embodiments be lined with an impermeable plastic or other material, particularly on the bottom, to prevent liquid from escaping once the wicking material is saturated.

Figure 9:
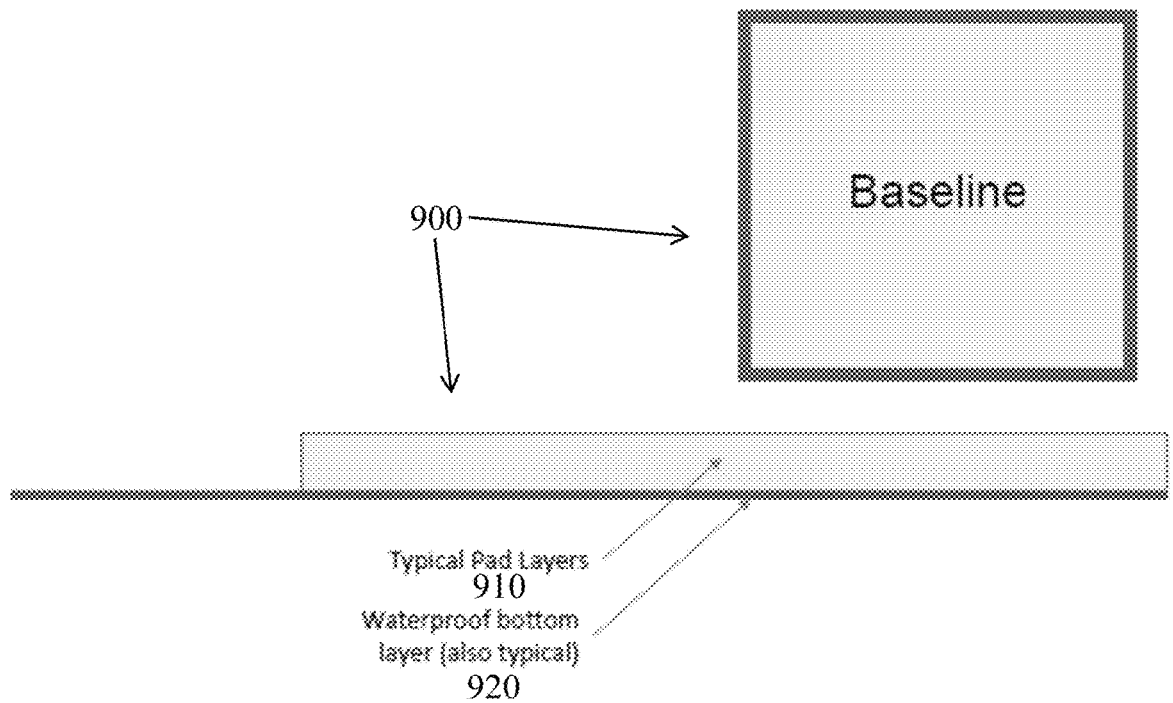
FIG. 9 is an overhead and detail cross-sectional diagram illustrating a pet training pad, according to an embodiment of the present invention.

FIG. 9 is an overhead and detail cross-sectional diagram illustrating a pet training pad 900. Typical absorbent pad layers 910 are placed on top of a waterproof bottom layer 920 to prevent urine from soaking through to the surface underneath.

Figure 10:
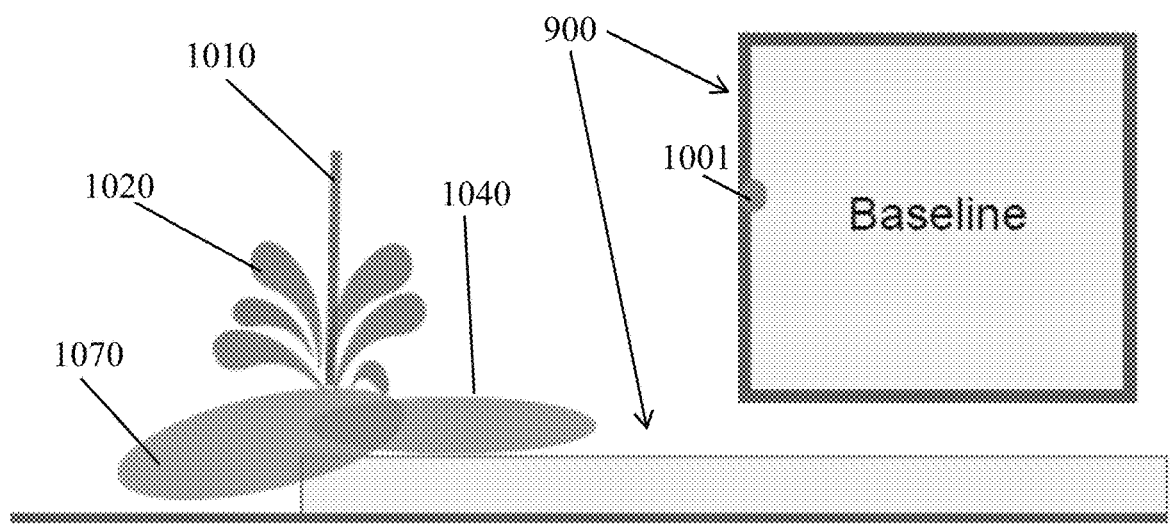
FIG. 10 is an overhead and detail cross-sectional diagram illustrating a pet training pad receiving a stream of liquid near its periphery, according to an embodiment of the present invention.

FIG. 10 is an overhead and detail cross-sectional diagram illustrating a pet training pad 900 receiving a stream of liquid 1010 near its periphery, according to an embodiment of the present invention. The liquid is splashing 1020 at the point of contact and spilling 1070 over the edge of the absorbent pad and onto the waterproof bottom layer around the periphery, while a portion 1040 is retained unabsorbed on the pad. The total volume of liquid 1001 is also shown from an overhead perspective.

Figure 11:
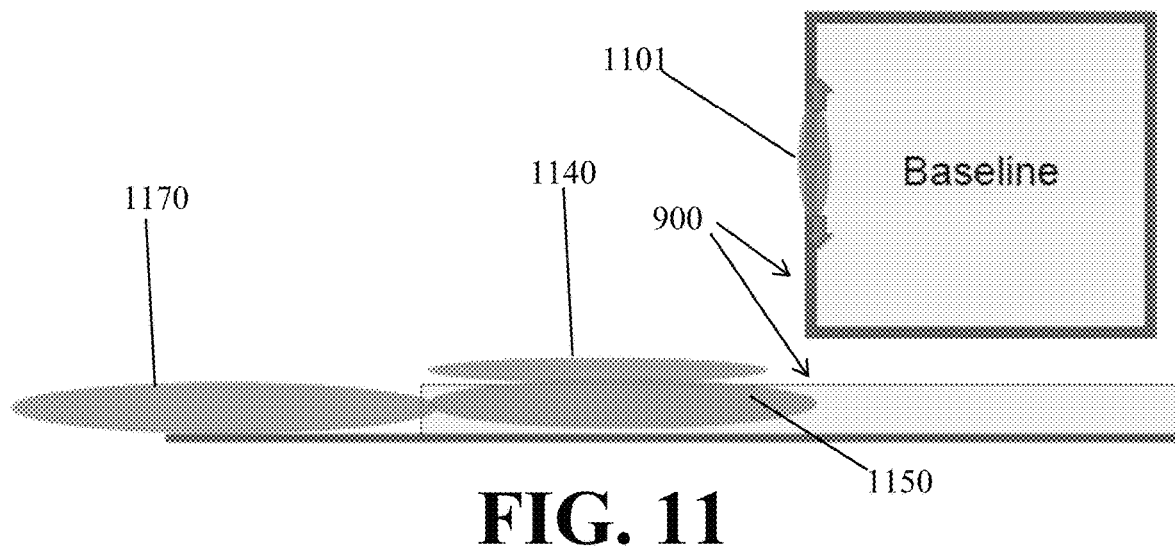
FIG. 11 is an overhead and detail cross-sectional diagram illustrating a pet training pad immediately after receiving a stream of liquid near its periphery, according to an embodiment of the present invention.

FIG. 11 is an overhead and detail cross-sectional diagram illustrating a pet training pad 900 immediately after receiving a stream of liquid near its periphery, according to an embodiment of the present invention. Some liquid 1140 remains on top of the absorbent pad and some 1150 has been absorbed. Some water 1170 is also on the waterproof bottom layer around the periphery and spilling over it onto the surface beneath. Spilled, absorbed and unabsorbed liquid 1170, 1150, 1140 make up total surface liquid volume 1101.

Figure 12:
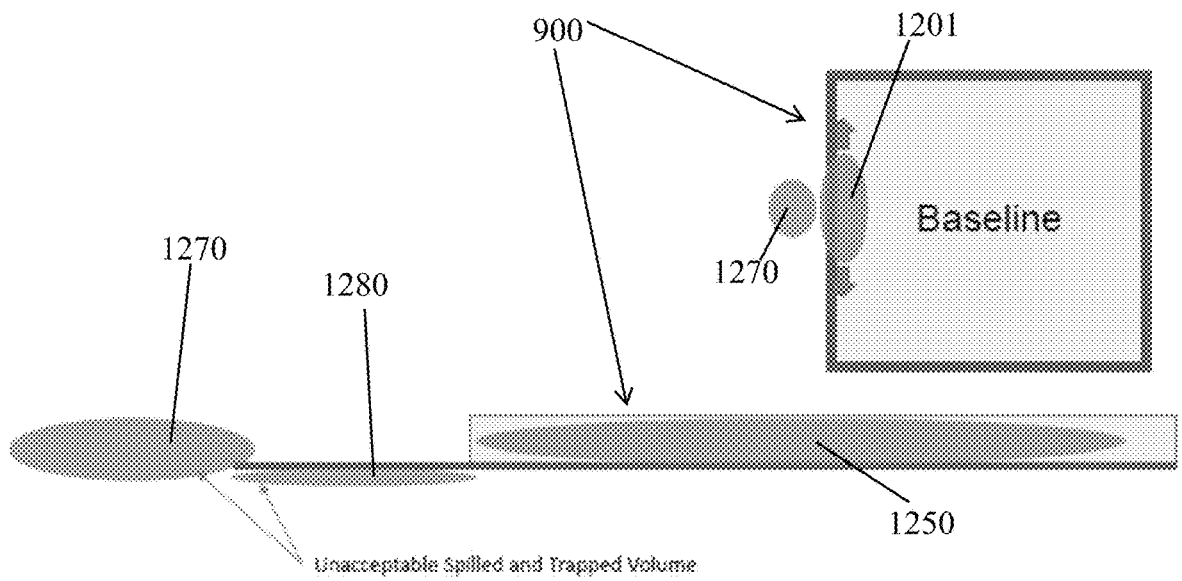
FIG. 12 is an overhead and detail cross-sectional diagram illustrating a pet training pad some time after receiving a stream of liquid near its periphery, according to an embodiment of the present invention.

FIG. 12 is an overhead and detail cross-sectional diagram illustrating a pet training pad 900 sometime after receiving a stream of liquid near its periphery, according to an embodiment of the present invention. Some liquid 1250 is absorbed by the absorbent pad and kept away from the surface underneath by the waterproof bottom layer. Other liquid 1270 has spilled off the waterproof bottom layer and is sitting on the surface beneath. Some liquid 1280 has spilled off the edge of the waterproof bottom layer and been wicked underneath, where it is trapped between the waterproof bottom layer and the surface beneath, and will not easily be evaporated. Trapped and absorbed liquid 1280, 1250 respectively make up surface liquid volume 1201.

Figure 13:
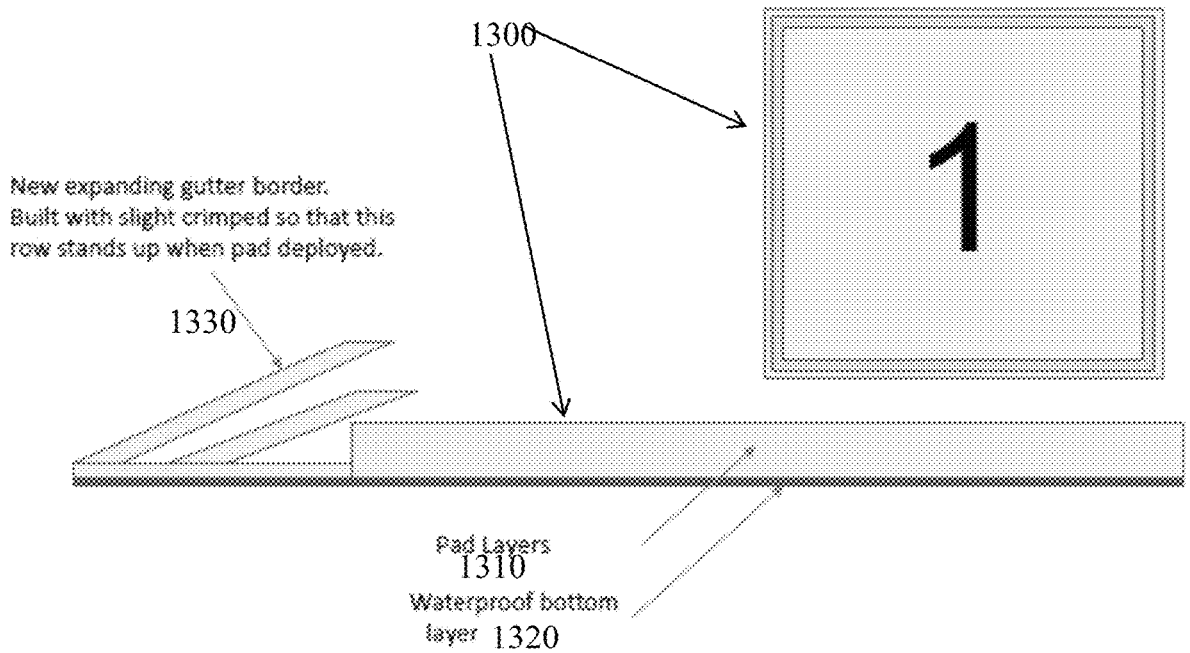
FIG. 13 is an overhead and detail cross-sectional diagram illustrating a pet training pad with fringe gutter, according to an embodiment of the present invention.

FIG. 13 is an overhead and detail cross-sectional diagram illustrating a pet training pad 1300 with fringe gutter 1330, according to an embodiment of the present invention. The fringe gutter 1330 sits on top of the periphery of the waterproof bottom layer 1320 that extends beyond the edge of the absorbent pad 1310.

Figure 14:
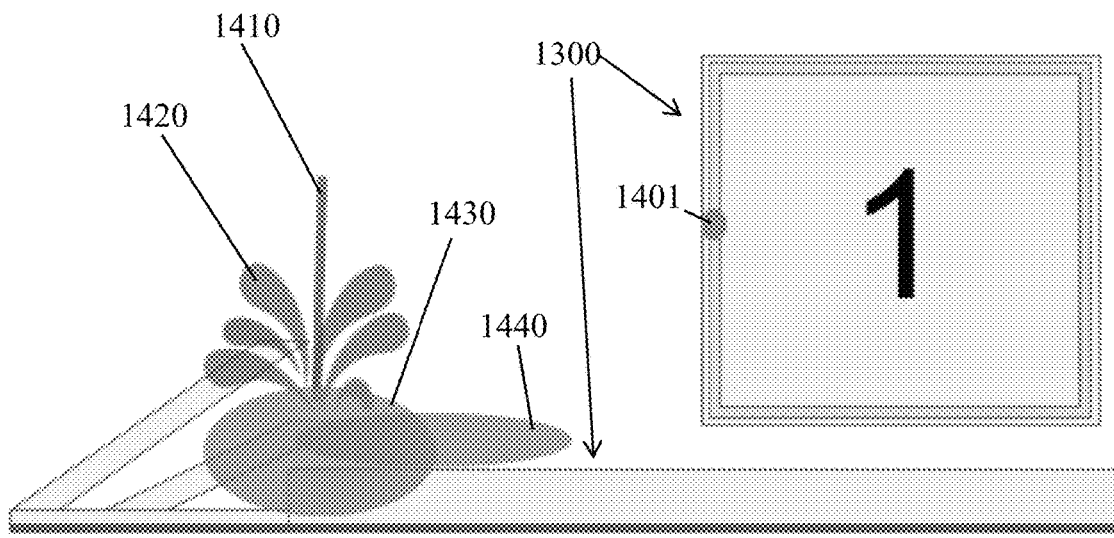
FIG. 14 is an overhead and detail cross-sectional diagram illustrating a pet training pad with fringe gutter receiving a stream of liquid near its periphery, according to an embodiment of the present invention.

FIG. 14 is an overhead and detail cross-sectional diagram illustrating a pet training pad 1300 with fringe gutter receiving a stream of liquid 1410 near its periphery, according to an embodiment of the present invention. Although the liquid stream 1410 is near the edge of the absorbent pad, the fringe gutter 1330 blocks and deflects splashing liquid 1420 back towards the pad, creating blocked volume 1430 and unabsorbed volume 1440, which together make up surface liquid volume 1401.

Figure 15:
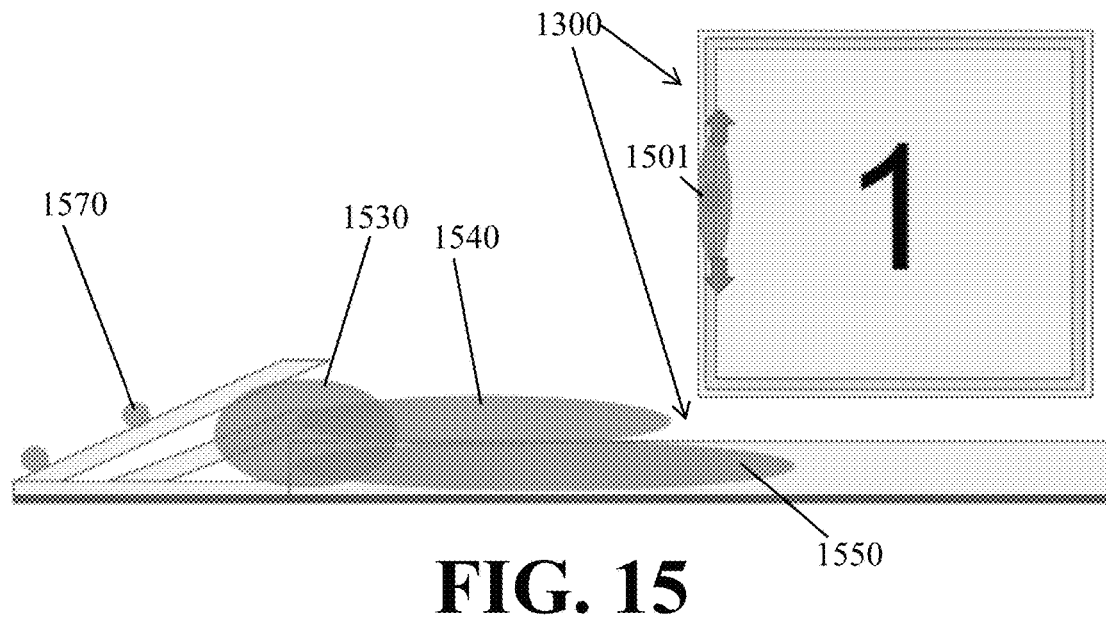
FIG. 15 is an overhead and detail cross-sectional diagram illustrating a pet training pad with fringe gutter immediately after receiving a stream of liquid near its periphery, according to an embodiment of the present invention.

FIG. 15 is an overhead and detail cross-sectional diagram illustrating a pet training pad 1300 with fringe gutter immediately after receiving a stream of liquid near its periphery, according to an embodiment of the present invention. Most of the liquid 1550 is absorbed into the absorbent pad or sitting on top 1540 of the absorbent pad, some is in the fringe gutter 1530, and a small amount 1570 is dripping along the outside of the fringe gutter. Liquid 1570, 1530, 1540, 1550 make up surface liquid volume 1501.

Figure 16:
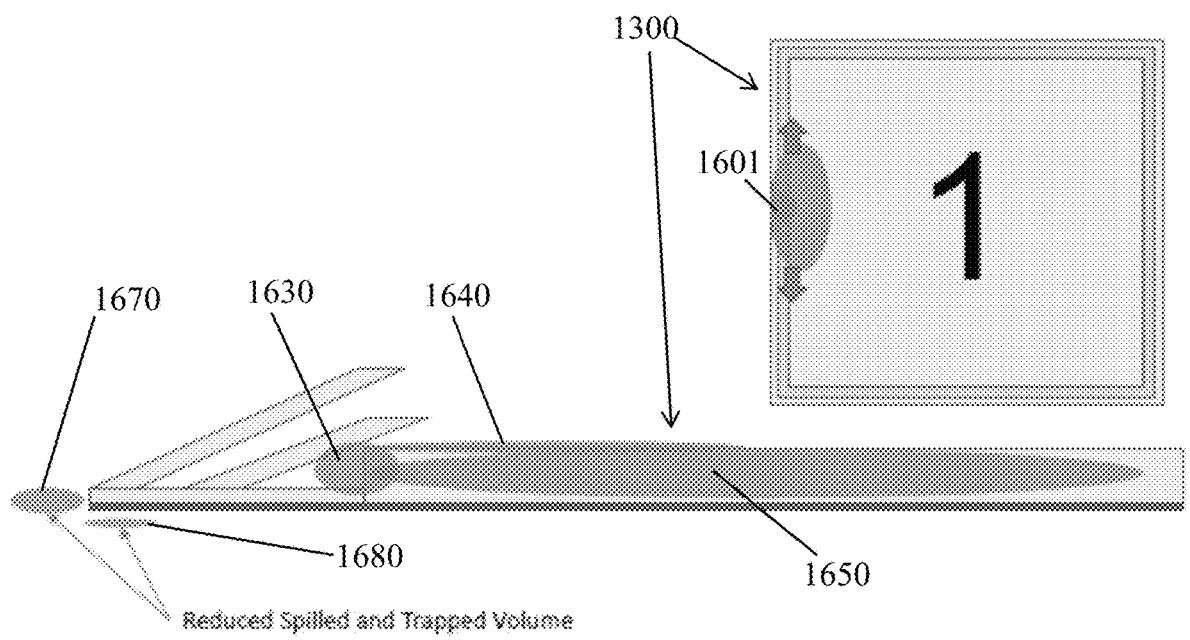
FIG. 16 is an overhead and detail cross-sectional diagram illustrating a pet training pad with fringe gutter some time after receiving a stream of liquid near its periphery, according to an embodiment of the present invention.

FIG. 16 is an overhead and detail cross-sectional diagram illustrating a pet training pad 1300 with fringe gutter sometime after receiving a stream of liquid near its periphery, according to an embodiment of the present invention. Most of the liquid 1650 is absorbed by the absorbent pad, with a small amount 1640 sitting on top of the absorbent pad or between the absorbent pad and the fringe gutter 1630. A small amount 1670 has spilled onto the surface beneath the pet training pad and a small amount 1680 has wicked under the bottom waterproof layer and against the surface beneath. Liquid 1630, 1640, 1650 make up surface liquid volume 1601.

Figure 17:
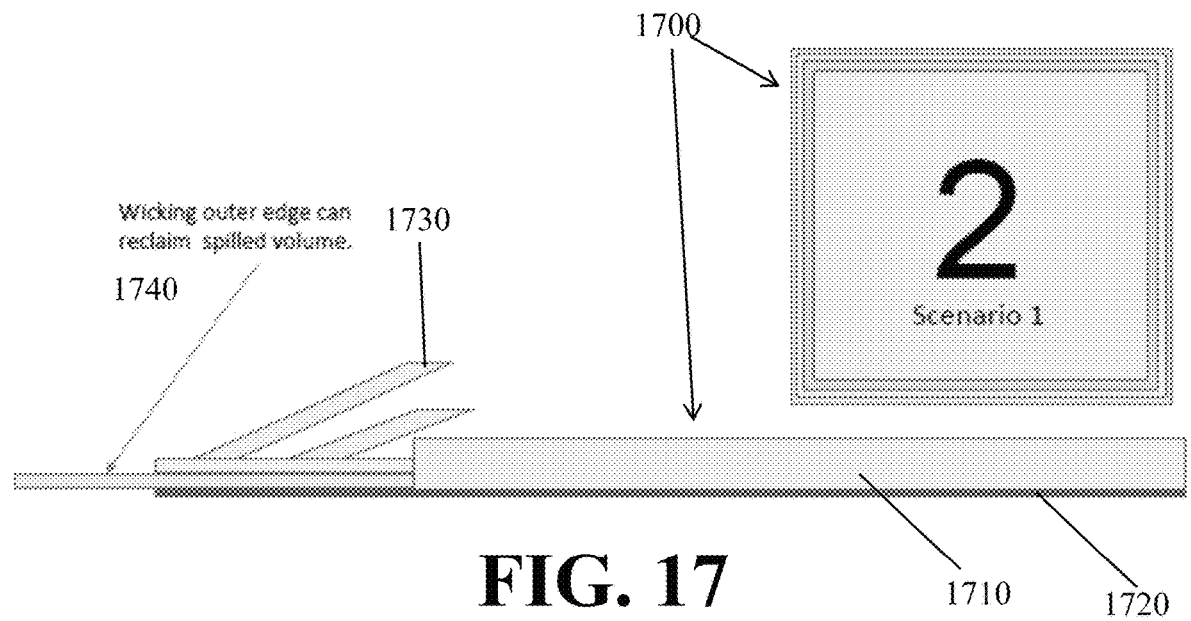
FIG. 17 is an overhead and detail cross-sectional diagram illustrating a pet training pad with fringe gutter and wicking outer edge, according to an embodiment of the present invention.

FIG. 17 is an overhead and detail cross-sectional diagram illustrating a pet training pad 1700 with fringe gutter 1730 and wicking outer edge 1740, according to an embodiment of the present invention. This embodiment is similar to that shown in FIG. 13, but a wicking outer edge 1740 is placed between the fringe gutter 1730 and the bottom waterproof layer 1720 periphery, and extends slightly beyond both.

Figure 18:
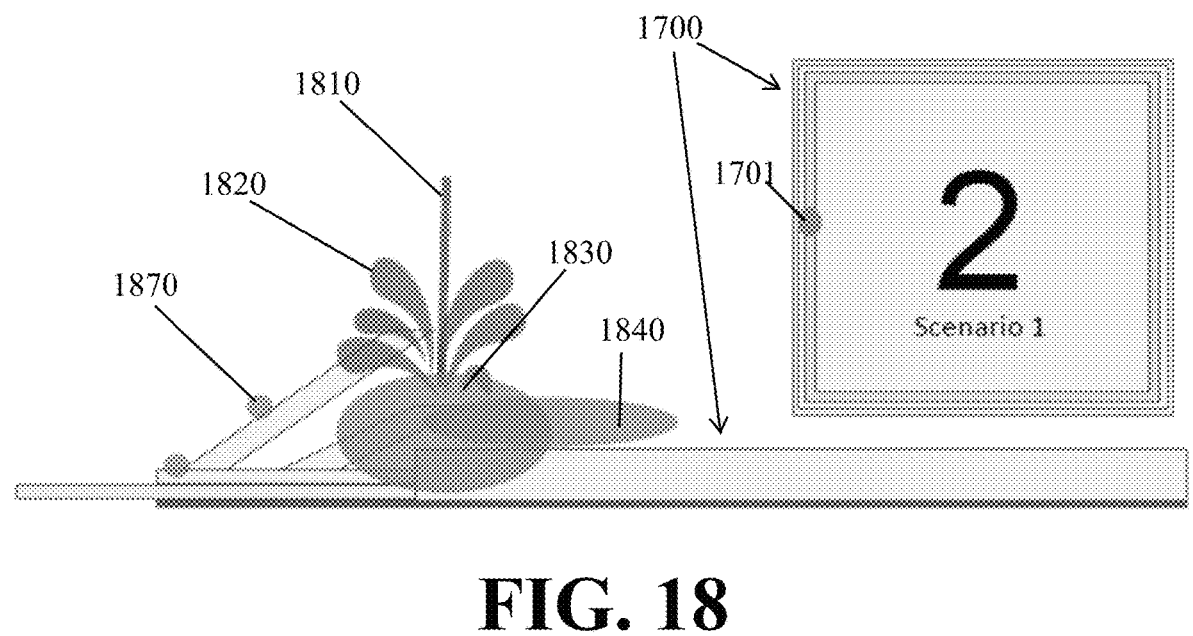
FIG. 18 is an overhead and detail cross-sectional diagram illustrating a pet training pad with fringe gutter and wicking outer edge receiving a stream of liquid near its periphery, according to an embodiment of the present invention.

FIG. 18 is an overhead and detail cross-sectional diagram illustrating a pet training pad 1700 with fringe gutter and wicking outer edge receiving a stream of liquid 1810 near its periphery, according to an embodiment of the present invention. As in FIG. 14, most of the splashing 1820 liquid stream is blocked and deflected back towards the absorbent pad, forming unabsorbed liquid 1840 and blocked liquid 1830, which together make up surface liquid volume 1701.

Figure 19:
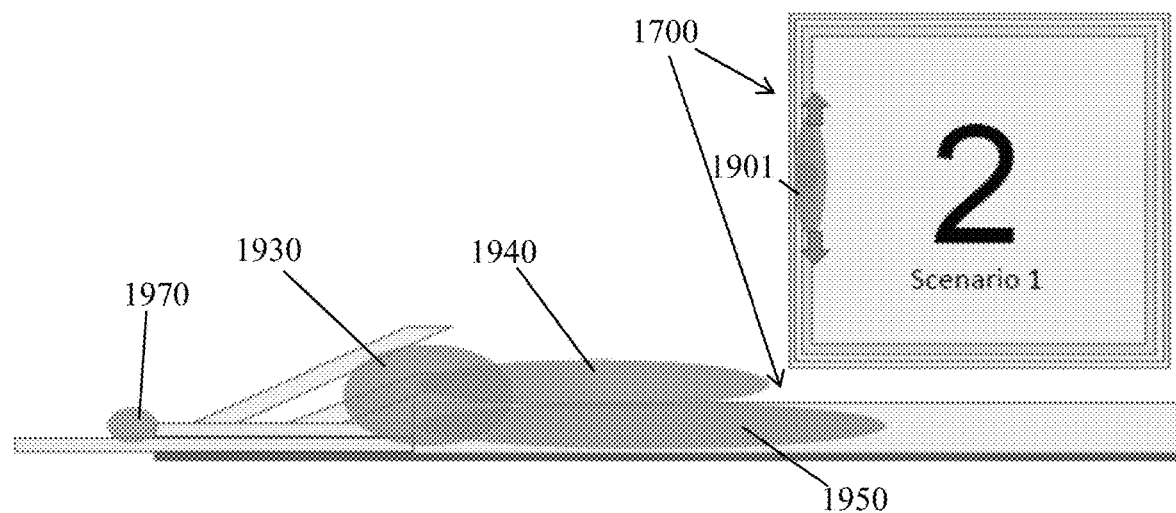
FIG. 19 is an overhead and detail cross-sectional diagram illustrating a pet training pad with fringe gutter and wicking outer edge immediately after receiving a stream of liquid near its periphery, according to an embodiment of the present invention.

FIG. 19 is an overhead and detail cross-sectional diagram illustrating a pet training pad 1700 with fringe gutter and wicking outer edge immediately after receiving a stream of liquid near its periphery, according to an embodiment of the present invention. As in FIG. 15, most of the liquid 1950 is absorbed into the absorbent pad, on top of the absorbent pad 1940 or between the absorbent pad and the fringe gutter 1930. A small amount of liquid 1970 has spilled outside the fringe gutter and is on top of the wicking outer edge. Liquid 1930, 1940, 1950, 1930 together make up surface liquid volume 1901.

Figure 20:
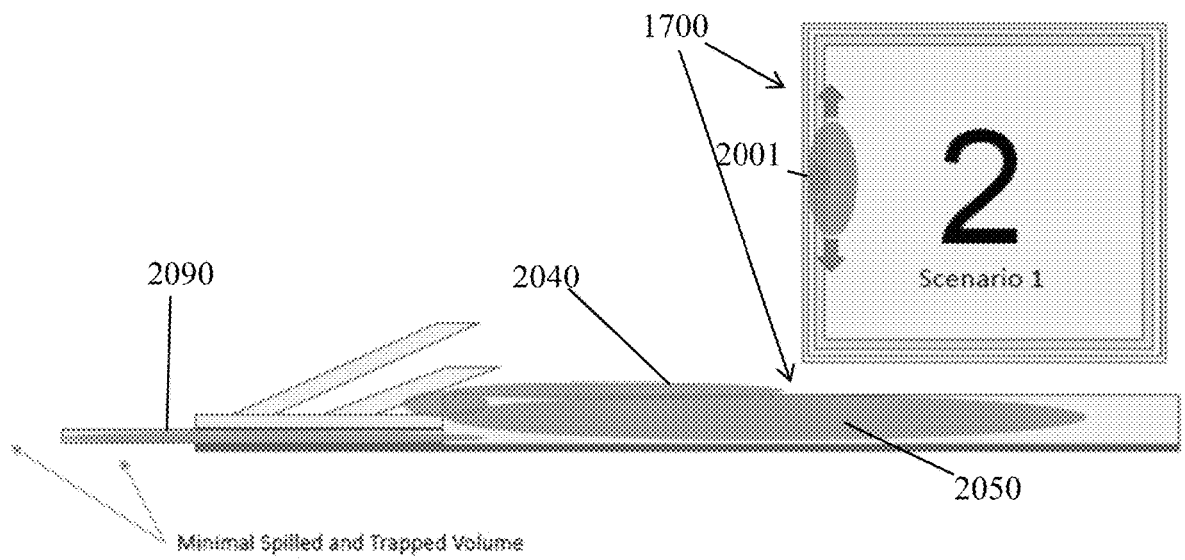
FIG. 20 is an overhead and detail cross-sectional diagram illustrating a pet training pad with fringe gutter and wicking outer edge some time after receiving a stream of liquid near its periphery, according to an embodiment of the present invention.

FIG. 20 is an overhead and detail cross-sectional diagram illustrating a pet training pad 1700 with fringe gutter and wicking outer edge sometime after receiving a stream of liquid near its periphery, according to an embodiment of the present invention. The liquid 2090 that was on the wicking outer edge is wicked throughout the wicking edge and back into the absorbent pad. No liquid is on the surface beneath the pet training pad or trapped under the bottom absorbent layer. Unabsorbed volume 2040 and absorbed volume 2050 together make up surface liquid volume 2001.

Figure 21:
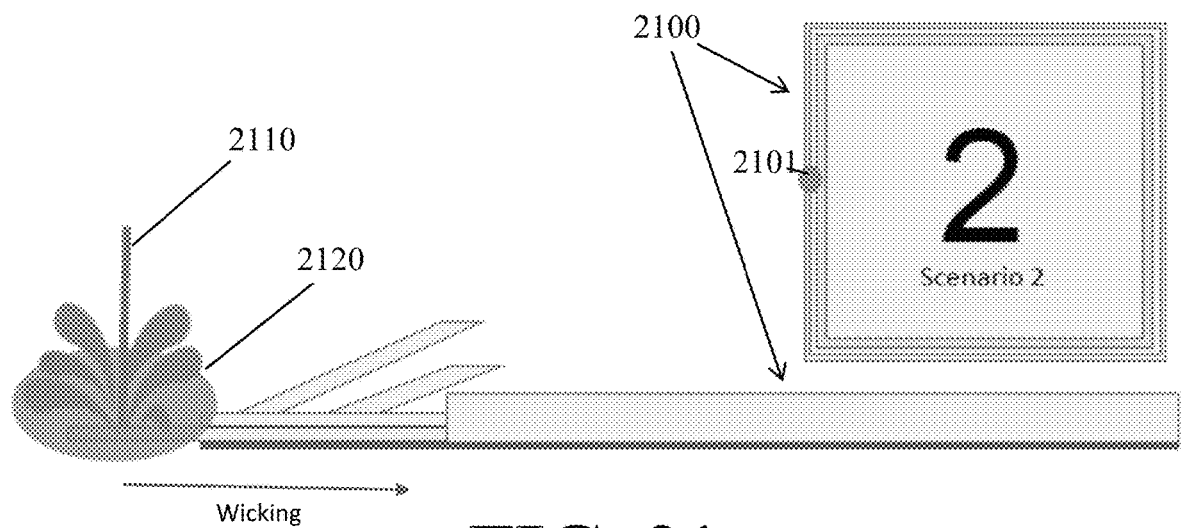
FIG. 21 is an overhead and detail cross-sectional diagram illustrating a pet training pad with fringe gutter and wicking outer edge receiving a stream of liquid directly on the wicking outer edge, according to an embodiment of the present invention.

FIG. 21 is an overhead and detail cross-sectional diagram illustrating a pet training pad 2100 with fringe gutter and wicking outer edge receiving a stream of liquid 2110 directly on the wicking outer edge, according to an embodiment of the present invention. This liquid stream and its splash zone 2120 is initially not touching the absorbent pad at all.

Figure 22:
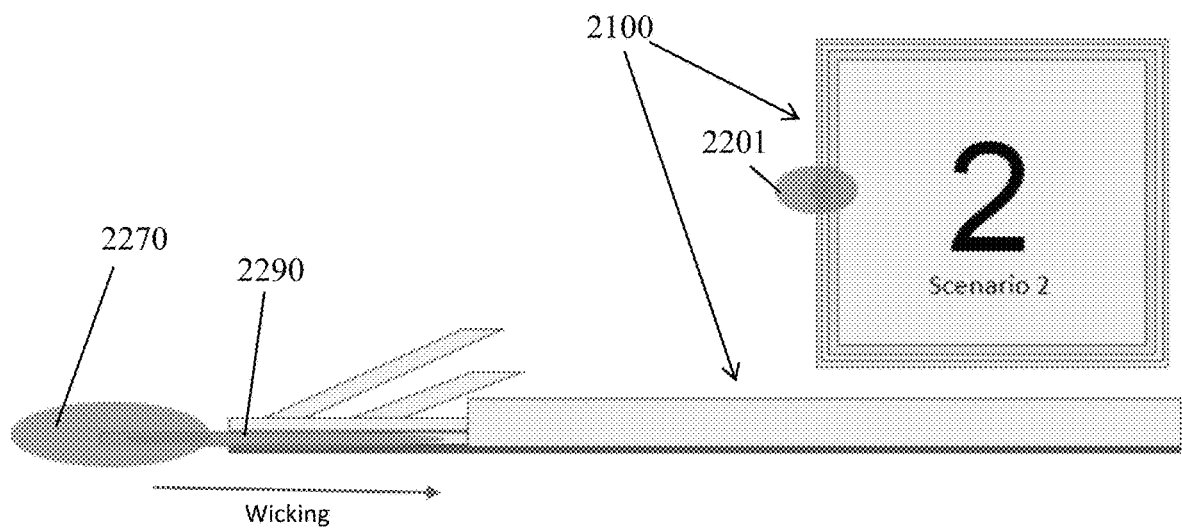
FIG. 22 is an overhead and detail cross-sectional diagram illustrating a pet training pad with fringe gutter and wicking outer edge immediately after receiving a stream of liquid on the wicking outer edge, according to an embodiment of the present invention.

FIG. 22 is an overhead and detail cross-sectional diagram illustrating a pet training pad 2100 with fringe gutter and wicking outer edge immediately after receiving a stream of liquid on the wicking outer edge, according to an embodiment of the present invention. The wicking layer 2290 draws the liquid 2270 in throughout its volume and towards the absorbent pad. Total surface volume 2201 includes the absorbed and unabsorbed portion of liquid 2270.

Figure 23:
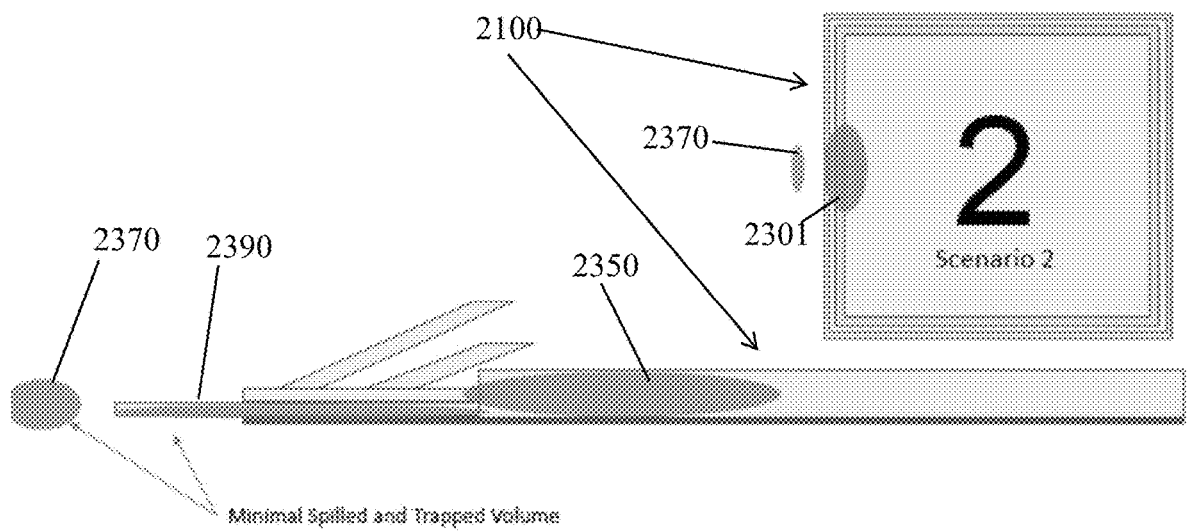
FIG. 23 is an overhead and detail cross-sectional diagram illustrating a pet training pad with fringe gutter and wicking outer edge some time after receiving a stream of liquid on the wicking outer edge, according to an embodiment of the present invention.

FIG. 23 is an overhead and detail cross-sectional diagram illustrating a pet training pad 2100 with fringe gutter and wicking outer edge sometime after receiving a stream of liquid on the wicking outer edge, according to an embodiment of the present invention. The wicking edge 2390 has wicked most of the liquid 2370 into itself and the absorbent pad 2350, leaving a small amount on the surface beneath the pet training pad, but not trapped beneath the bottom waterproof layer. Surface volume 2301 includes liquid 2370 absorbed into the wicking layer 2390 and pad 2350.

Figure 24:
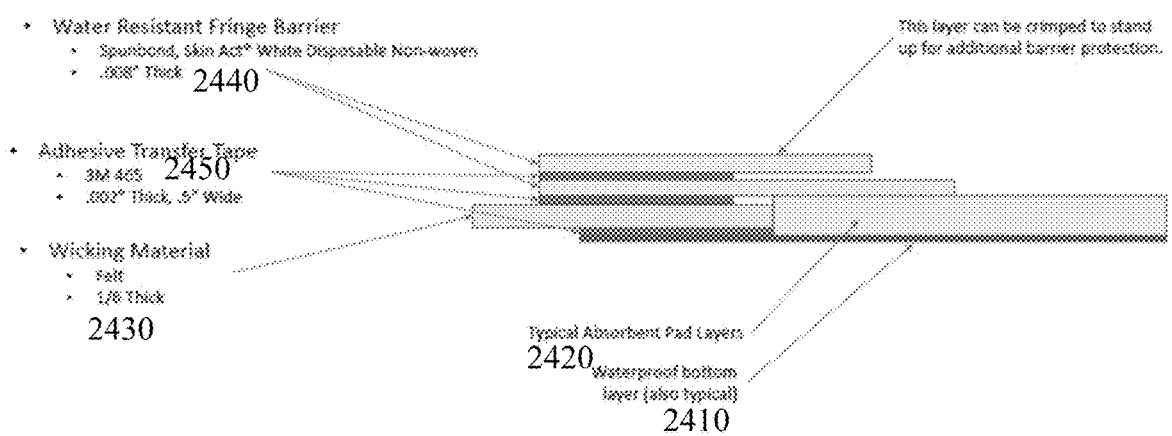
FIG. 24 is a detail cross-sectional diagram illustrating a pet training pad with fringe barriers and wicking material outer edge, according to an embodiment of the present invention.

FIG. 24 is a detail cross-sectional diagram illustrating a pet training pad with fringe barriers 2440 and wicking material outer edge 2430, according to an embodiment of the present invention. The detail focuses on the outer edge of the pet training pad, and it is to be understood that there is a similar edge on the opposite side that is not shown, as well as a much larger absorbent pad 2420 than is shown. The absorbent pad 2420 is on top of the waterproof bottom layer 2410, which extends somewhat beyond the edge of the absorbent pad 2420. A wicking material 2430, here ⅛" thick felt, is attached with adhesive transfer tape 2450, here 3M 465 0.002" thick, 0.5" wide tape, to the waterproof bottom layer 2410 where it extends beyond the side of the absorbent pad 2420. A first water resistant (impermeable) fringe barrier 2440, here spunbond Skin Act white disposable non-woven 0.008" thick fabric, is attached with the same adhesive transfer tape 2450 to the wicking material 2430. It does not extend to the far edge of the wicking material 2430, but extends all the way back to the absorbent pad 2420 and on top of it. A second layer of water resistant fringe barrier 2440 is attached to the first water resistant fringe barrier with the same adhesive transfer tape 2450, and extends to the far edge of the first water resistant fringe barrier and over the top of the edge of the absorbent pad 2420, but not quite as far as the first water resistant fringe barrier. In the illustrated embodiment, the second layer of water resistant fringe barrier 2440 lies flat, but in other embodiments it may be crimped to stand up for additional barrier protection (deflection/blocking of liquid back onto the absorbent pad).

Figure 25:
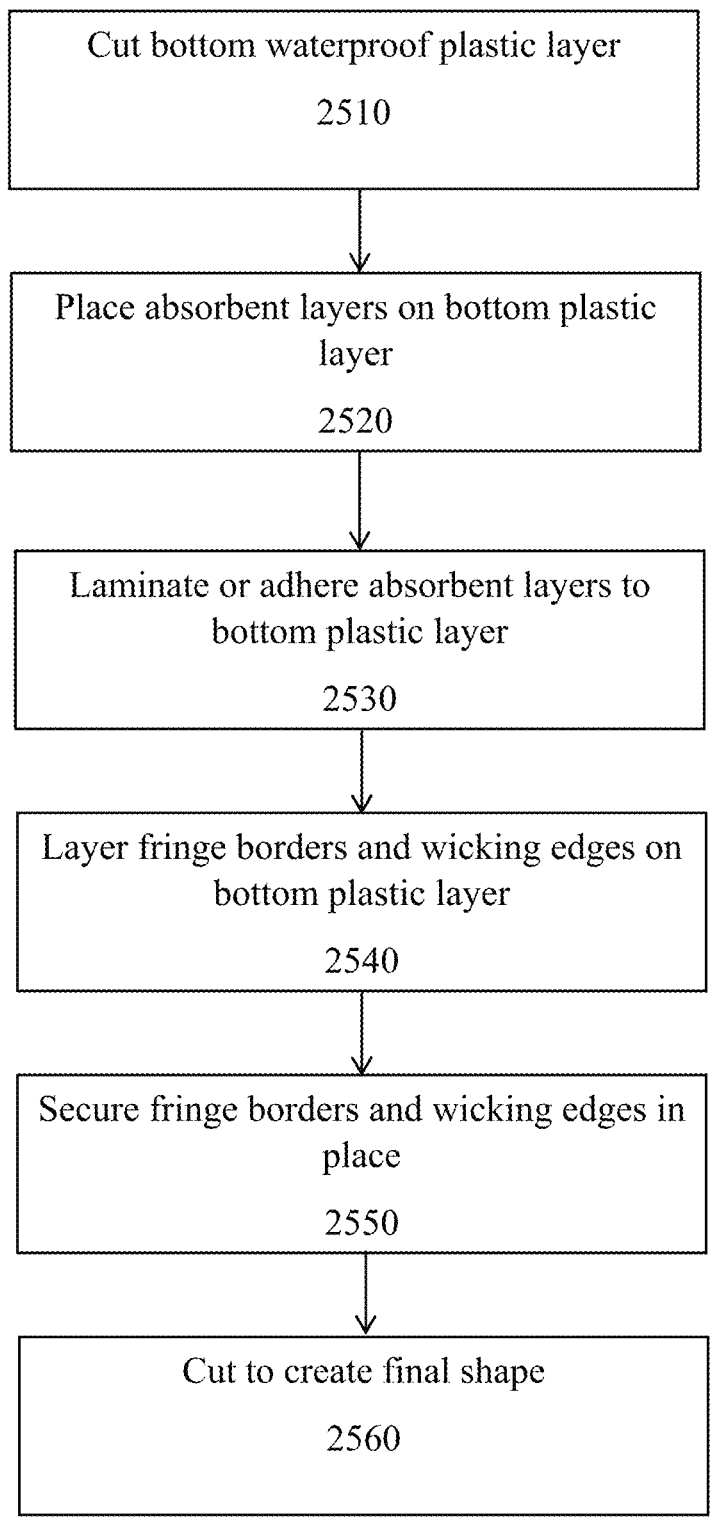
FIG. 25 is a flowchart illustrating a pet training pad manufacturing method, according to an embodiment of the present invention.

FIG. 25 is a flowchart illustrating a pet training pad manufacturing method, according to an embodiment of the present invention. A bottom waterproof plastic layer is cut 2510, absorbent layers are placed 2520 on the bottom plastic layer and laminated or adhered 2530 to the bottom waterproof plastic layer to keep the absorbent layers together and positioned, fringe borders and wicking edges are placed 2540 on the waterproof plastic layer and secured in place 2550, and the pad is cut 2560 to create a final shape.

Figure 26:
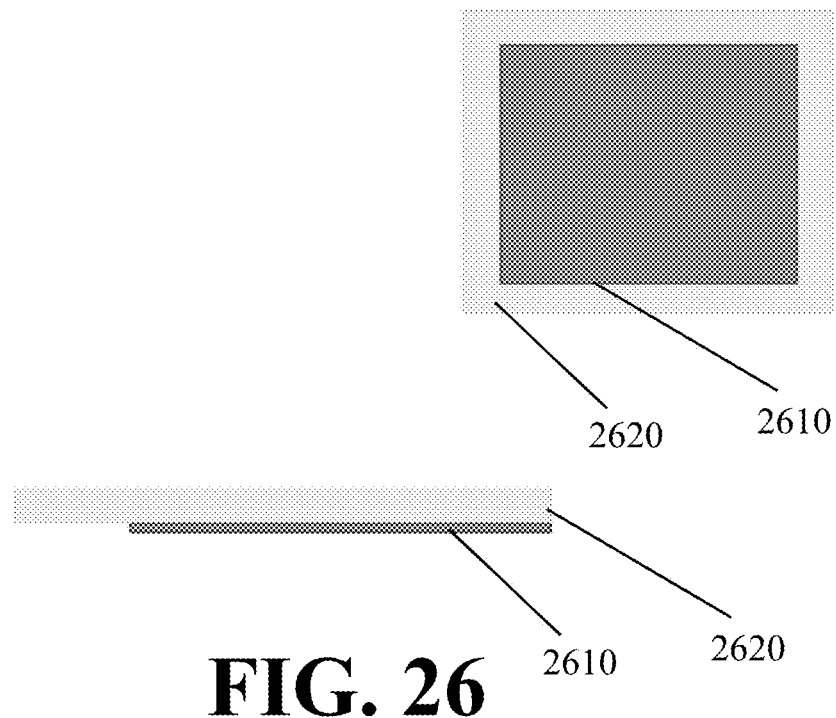
FIG. 26 is a bottom and detail cross-sectional diagram illustrating a pet training pad with absorbent pad extending beyond waterproof bottom layer, according to an embodiment of the present invention.

FIG. 26 is a bottom and detail cross-sectional diagram illustrating a pet training pad with absorbent pad 2620 extending beyond waterproof bottom layer 2610, according to an embodiment of the present invention. Here the absorbent pad acts as its own wicking layer, collecting liquid that spills on the surface on which the pad is placed and absorbing it inwards towards the central pad and avoiding liquid trapped under the waterproof layer. In the embodiment shown, the absorbent pad 2620 has the same thickness throughout, however in other embodiments the absorbent pad may be, for example, thinner in the portion which extends beyond the waterproof layer 2610.

Figure 27:
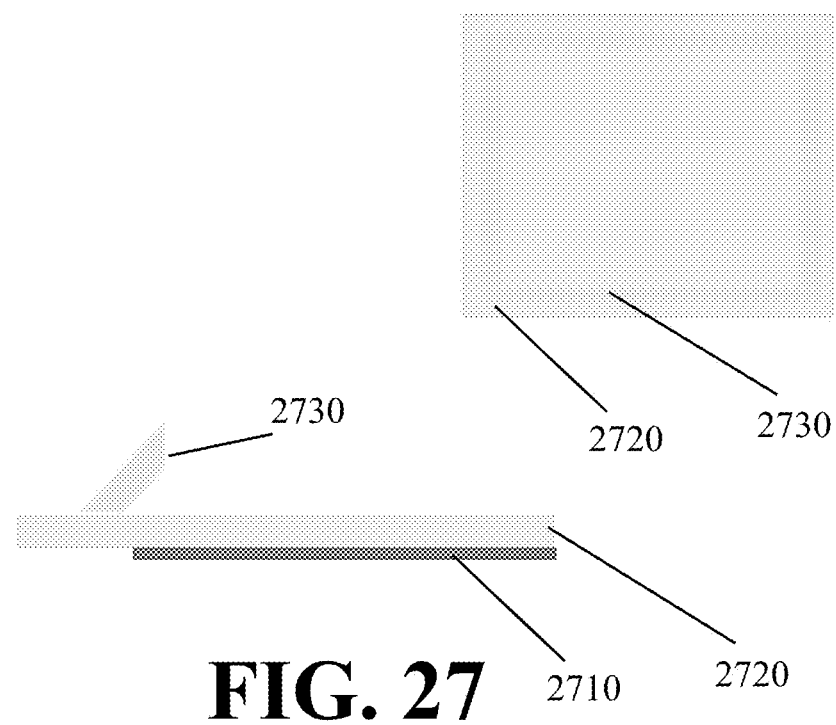
FIG. 27 is an overhead and detail cross-sectional diagram illustrating a pet training pad with absorbent pad extending beyond waterproof bottom layer and fringe gutter, according to an embodiment of the present invention.

FIG. 27 is an overhead and detail cross-sectional diagram illustrating a pet training pad with absorbent pad 2720 extending beyond waterproof bottom layer 2710 and fringe gutter 2730, according to an embodiment of the present invention. This embodiment is the same as that shown in FIG. 26, except for the addition of the fringe gutter 2730 to protect against splashing as in other embodiments illustrated and described above. Various types, shapes, sizes and numbers of fringes are possible in various embodiments.

The invention is not limited to the particular embodiments described above in detail. Those skilled in the art will recognize that other arrangements could be devised, for example, using many different known materials and manufacturing steps, using many different shapes for the pad and components thereof and different combinations and numbers of the various components, etc. The invention includes every possible combination of the features described as being part of various embodiments. While the invention has been described with reference to specific illustrative embodiments, modifications and variations of the invention may be constructed without departing from the scope of the invention.

I claim:

1. A pet training pad, comprising:
a central absorbent pad on top of a waterproof bottom layer, wherein the waterproof bottom layer covers one side of the central absorbent pad;
a wicking material around a periphery of the central absorbent pad, wherein the wicking material does not contact a top surface of the central absorbent pad; and
one or more fringe barriers around the periphery of the central absorbent pad, wherein the fringe barriers extend above a top surface of the central absorbent pad.

2. The pet training pad of claim 1, wherein the one or more fringe barriers are on top of the wicking material.

3. The pet training pad of claim 1, wherein the one or more fringe barriers comprise two fringe barriers stacked on top of each other.

4. The pet training pad of claim 3, wherein the fringe barriers are attached to each other and to the wicking material by adhesive tape, and the wicking material is attached to the waterproof bottom layer by adhesive tape.

5. The pet training pad of claim 1, wherein the one or more fringe barriers are made of polyester.

6. The pet training pad of claim 1, wherein the one or more fringe barriers extend at an angle between 5° and 60° from a direction perpendicular to a plane of the top surface of the central absorbent pad.

7. The pet training pad of claim 6, wherein the one or more fringe barriers extend at the angle between 5° and 60° before liquid contact.

8. The pet training pad of claim 1, wherein the waterproof bottom layer extends beyond the central absorbent pad around a periphery of the central absorbent pad and the wicking material and/or the one or more fringe barriers are on top of the waterproof bottom layer where the waterproof bottom layer extends beyond the central absorbent pad.

9. The pet training pad of claim 1, wherein the wicking material is disposed between the one or more fringe barriers and the waterproof bottom layer.

10. The pet training pad of claim 1, wherein the wicking material extends beyond both the one or more fringe barriers and the waterproof bottom layer.

11. The pet training pad of claim 1, wherein the wicking material extends continuously around the entire periphery of the central absorbent pad.

12. The pet training pad of claim 1, wherein the one or more fringe barriers do not contact a top surface of the central absorbent pad.

13. The pet training pad of claim 1, wherein, before liquid contact, the one or more fringe barriers extend above a top surface of the central absorbent pad.

14. The pet training pad of claim 1, wherein, before liquid contact, the one or more fringe barriers extend vertically upward, thereby deflecting splatter from the central absorbent pad.

15. A pet training pad, comprising:
a central absorbent pad on top of a waterproof bottom layer, wherein the waterproof bottom layer covers one side of the central absorbent pad; and
a wicking material around a periphery of the central absorbent pad, wherein the wicking material does not contact a top surface of the central absorbent pad,
wherein the wicking material extends beyond an outer edge of the waterproof bottom layer.

16. The pet training pad of claim 15, wherein the wicking material comprises felt.

17. The pet training pad of claim 15, wherein the waterproof bottom layer extends beyond the central absorbent pad around a periphery of the central absorbent pad and the wicking material is on top of the waterproof bottom layer where the waterproof bottom layer extends beyond the central absorbent pad.

18. The pet training pad of claim 15, wherein the wicking material extends continuously around the entire periphery of the central absorbent pad.

19. A pet training pad, comprising:
a central absorbent pad on top of a waterproof bottom layer, wherein the waterproof bottom layer covers one side of the central absorbent pad;
a wicking material around a periphery of the central absorbent pad, wherein the wicking material does not contact a top surface of the central absorbent pad; and
one or more fringe barriers,
wherein the one or more fringe barriers extend above a top surface of the central absorbent pad.

* * * * *